US012607537B2

(12) United States Patent
Fiebiger et al.

(10) Patent No.: US 12,607,537 B2
(45) Date of Patent: Apr. 21, 2026

(54) METHOD AND DEVICES FOR DETECTING OUTPUT-SIDE LEAKS IN A DOUBLE CONE AIR POWER BOOSTER

(71) Applicant: SAMSON AKTIENGESELLSCHAFT, Frankfurt (DE)

(72) Inventors: Christian Fiebiger, Hofheim (DE); Marco Fischer, Frankfurt (DE); Thomas Stein, Frankfurt (DE)

(73) Assignee: SAMSON AKTIENGESELLSCHAFT, Frankfurt (DE)

( * ) Notice: Subject to any disclaimer, the term of this patent is extended or adjusted under 35 U.S.C. 154(b) by 306 days.

(21) Appl. No.: 18/580,780

(22) PCT Filed: Jul. 13, 2022

(86) PCT No.: PCT/EP2022/069677
§ 371 (c)(1),
(2) Date: Jan. 19, 2024

(87) PCT Pub. No.: WO2023/001675
PCT Pub. Date: Jan. 26, 2023

(65) Prior Publication Data
US 2024/0353284 A1 Oct. 24, 2024

(30) Foreign Application Priority Data
Jul. 19, 2021 (DE) .......................... 102021118552.1

(51) Int. Cl.
*G01M 3/28* (2006.01)
(52) U.S. Cl.
CPC .................................. *G01M 3/2876* (2013.01)
(58) Field of Classification Search
CPC .................................................. G01M 3/2876
See application file for complete search history.

(56) References Cited

U.S. PATENT DOCUMENTS

| | | | |
|---|---|---|---|
| 4,157,656 A | 6/1979 | Walle | |
| 2003/0208305 A1 | 11/2003 | Junk et al. | |
| 2013/0063152 A1* | 3/2013 | Kasashima | ............ G01R 31/52 |
| | | | 324/509 |

FOREIGN PATENT DOCUMENTS

| | | |
|---|---|---|
| DE | 3708471 A1 | 9/1988 |
| DE | 3741364 A1 | 6/1989 |

(Continued)

OTHER PUBLICATIONS

International Search Report (with English translation) received in corresponding Application No. PCT/EP2022/069677, dated Oct. 25, 2022, 4 pages.

*Primary Examiner* — Eric S. McCall
(74) *Attorney, Agent, or Firm* — Dority & Manning, P.A.

(57) ABSTRACT

A method for detecting output-side leaks in a double cone air power booster is proposed. Initially, a reference curve is recorded which relates a control variable for the outlet pressure to the outlet pressure. During operation, at least one steady state is determined, wherein only steady states preceded by a drop in the output pressure of the double cone air power booster are considered. Values of the control variable and the output pressure belonging to the steady state are determined and compared with the reference curve. If the output pressure determined is smaller by a specified tolerance than the output pressure to be expected according to the reference curve for the control variable determined, an output-side leakage is determined. In this way, leaks in the consumer system connected to a double-cone air power booster, for example a pneumatic control valve actuator, can be detected in an uncomplicated manner, which can save costs for maintenance requirements that are detected too late. Additional components are not required.

12 Claims, 7 Drawing Sheets

(56) References Cited

FOREIGN PATENT DOCUMENTS

| | | | |
|---|---|---|---|
| DE | 19818336 | C1 | 1/2000 |
| EP | 1769159 | B1 | 4/2007 |
| WO | WO 2018035181 | A1 | 2/2018 |

\* cited by examiner

METHOD AND DEVICES FOR DETECTING OUTPUT-SIDE LEAKS IN A DOUBLE CONE AIR POWER BOOSTER

CROSS-REFERENCE TO RELATED APPLICATIONS

This application is a US national phase of International Patent Application No. PCT/EP2022/069677 filed on Jul. 13, 2022, which is based upon and claims the right of priority to German Patent Application No. DE 10 2021 118 552.1 filed Jul. 19, 2021, the disclosures of both of which are hereby incorporated herein in their entirety for all purposes.

FIELD OF THE INVENTION

The invention relates to a method for detecting output-side leaks in a double cone air power booster, as well as corresponding systems and/or devices. The aforementioned air power boosters are often used for the controlled compressed air supply of pneumatic actuators of process control valves or other compressed air consumers.

Increasing demands are being placed on such control valves in terms of their ability to detect changes and, in particular, deteriorations in their operating conditions. This also includes, for example, indications of leaks in the pneumatic system. In the long term, these can cause considerable costs and even impair safety, as it may no longer be possible to move to certain valve positions, for example. They can also lead to increased noise levels.

PRIOR ART

An electropneumatic control system that includes a secondary pneumatic power stage is described, for example, in EP 1 769 159 B1. Here, for example, a double cone air power booster is used. Diagnostic options related to the compressed air system and, in particular, leaks thereof, are not provided.

A pneumatic amplifier designed as a double cone air power booster is described, for example, in publication DE 37 41 364 A1. No diagnostic options are described here either.

Methods and devices for testing pneumatic signal boosters during operation are known from publication WO 2018/035181 A1. This makes it possible, for example, to obtain information about the basic functionality of these devices. However, it is not possible to obtain information about leaks in the compressed air system using the methods and devices described there. A leak detection system is described in U.S. Pat. No. 4,157,656 A. However, this requires the use of additional devices, which in turn require a pneumatic booster in order to amplify the output signal in such a way that it can be distinguished as clearly as possible from normal fluctuations.

The publication US 2003/0208305 A1 describes a method for diagnosing a pneumatic control circuit of a control valve. This includes the detection of output-side leaks in an air power booster arranged in the control circuit. For this purpose, a control signal and the output pressure of the air power booster are recorded. A comparison with a calculated mass flow is used to infer any leakage.

Problem

The object of the invention is to provide a method and a system which detects leaks in downstream consumers of a double cone air power booster and which is as straightforward as possible.

Solution

This object is solved by the subject matter of the independent claim. Advantageous embodiments of the subject matter of the independent claim are characterized in the subclaims. The wording of all claims is hereby incorporated into this description by reference.

The use of the singular shall not exclude the plural, which shall also apply in the reverse sense, unless otherwise indicated.

Individual method steps are described in more detail below. In a preferred variant of the invention, the steps are performed in the order indicated. However, the steps need not necessarily be performed in the order indicated, and the method to be described may also comprise further, unmentioned steps.

To solve the problem, a method for detecting output-side leaks of a double cone air power booster is proposed. The method comprises the following steps: Initially, a reference curve is recorded which relates an input variable to an output variable. The input variable is a variable that controls an output pressure of the double cone air power booster, e.g. the control pressure of the air power booster, or a current if an I/P converter is connected upstream. The output variable is the output pressure of the double cone air power booster or a variable controlled or derived from the output pressure, e.g. the position of the valve member if the air power booster supplies a pneumatic valve actuator with compressed air.

At least one steady state is then determined during operation. Only steady states that are preceded by a drop in the output pressure of the double cone air power booster are considered. The air power booster and/or any upstream elements are therefore still in exhaust air mode. Values of the input variable and the output variable that belong to the steady state are determined and compared with the reference curve. If the output pressure corresponding to the determined output variable is smaller by a specified tolerance than the output pressure to be expected according to the reference curve for the determined input variable, an output-side leak is determined. This is equivalent to determining an input variable for the output pressure corresponding to a determined output variable that is higher by an equivalent specified tolerance than would be expected according to the reference curve.

Output-side leaks are to be understood as leaks on the output side of the air power booster, i.e. leaks in downstream lines or compressed air consumers.

This method can be used to detect leaks on the output side of a double cone air power booster in an uncomplicated manner, in particular without additional components. As a result, early indications of any necessary maintenance can be obtained, which can save costs for maintenance requirements that are recognized too late.

If any leaks are detected at an early stage, the costs for compressed air generation are also reduced. It is also extremely important to recognize whether certain valve positions can no longer be reached due to the pressure loss caused by the leakage. The consequences may be safety-relevant or affect the end product. This can be prevented or detected at an early stage using the method described.

A more meaningful result is achieved by determining a plurality of steady states. For each of this plurality of steady states, values of the input variable and the output variable belonging to the steady state are determined. All these determined values are compared with the reference curve. This can prevent so-called "outliers" from causing erroneous leak messages.

The reliability of the leak detection is increased if an output-side leak is determined if, during a predetermined measuring period, all output pressures corresponding to the determined output variables are smaller by a predetermined tolerance than the output pressures to be expected according to the reference curve for the determined input variables. This ensures that no leakage is detected if at least one value determined during the predetermined measuring period matches the reference curve within the tolerance. In this way, erroneous messages become significantly less frequent.

The reliability of the leakage detection is also increased if an output-side leak is determined if, for a predetermined number of output variables determined most recently, the output pressures corresponding to the determined output variables are smaller by a predetermined tolerance than the output pressures to be expected according to the reference curve for the determined input variables. Erroneous messages can also be effectively suppressed in this way. This procedure is preferable if suitable steady-state conditions only last for a short time due to the operating situation. In this case, it could not always be guaranteed that a sufficient number of values for proper statistics can be determined in a predetermined measuring period, so that it is more advantageous to specify the number of these values and not the time in which they are determined.

For further evaluation and documentation, it is advantageous if the method comprises the further step of creating a data carrier (volatile or permanent) on which the determined values and/or results and/or the reference curve are stored.

The problem is further solved by a device which is configured to perform the method as described above.

The problem is also solved by a system for detecting output-side leaks of a double cone air power booster. This system comprises a double cone air power booster and a control and/or regulation system for controlling and/or regulating an input variable of the double cone air power booster, wherein the input variable is a variable which controls an output pressure of the double cone air power booster. The system further has means for determining a steady state and means for recording the input variable and an output variable, wherein the output variable is the output pressure of the double cone air power booster or a variable controlled by or derived from the output pressure. The system also has means for recording a reference curve relating the input variable to the output variable, means for comparing recorded values with the reference curve and means configured to perform the steps of a method as described above.

If the system comprises an I/P converter, the input variable can be an electrical current, which is advantageous in terms of the control and/or regulation of the double cone air power booster and the recording and evaluation of the data. The I/P converter provides a control pressure for the double cone air power booster. The input variable is then the current flowing through the I/P converter.

It is particularly advantageous if the I/P converter in the aforementioned system is constructed according to the nozzle-baffle plate principle. Such an I/P converter exhibits hysteresis behavior due to its electromagnetic components. This behavior is superimposed on the hysteresis-like behavior of the double cone air power booster during the transition between supply air and exhaust air mode, as a result of which the shape of the reference curve or characteristic curve is more pronounced. In particular, the supply air and exhaust air curves differ more strongly.

The problem is further solved by a positioner for a pneumatically actuated control valve having a system as described above.

The problem is also solved by a pneumatically actuated control valve having an aforementioned positioner, and also by a process plant having at least one aforementioned pneumatically actuated control valve.

The problem is also solved by a computer program, e.g. as part of a so-called firmware, comprising instructions which cause the above-mentioned device or the above-mentioned system or the above-mentioned positioner to perform the method steps described above.

The task is finally solved by a computer-readable medium on which the aforementioned computer program is stored.

Further details and features can be found in the following description of a preferred embodiment in conjunction with the figures. The respective features may be realized individually or in combination with one another. The possibilities for solving the problem are not limited to the embodiment. For example, range specifications always include all—unmentioned—intermediate values and all conceivable sub-intervals.

An embodiment is shown schematically in the figures. Identical reference numerals in the individual figures denote identical or functionally identical elements or elements that correspond to each other in terms of their functions. In detail:

Figure 1:
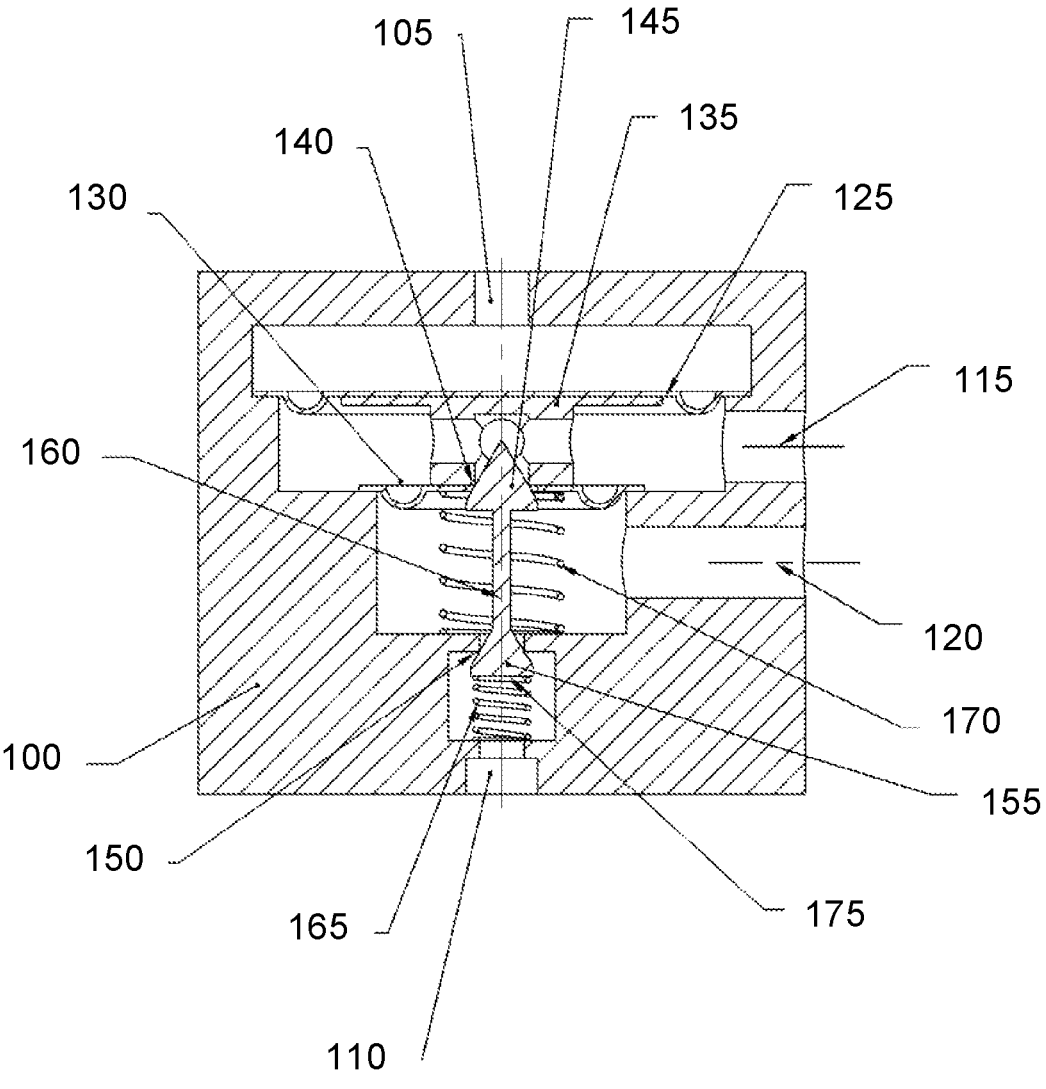
FIG. 1 shows a schematic sectional view of a double cone air power booster with additional spring in holding mode (prior art)
Figure 2:
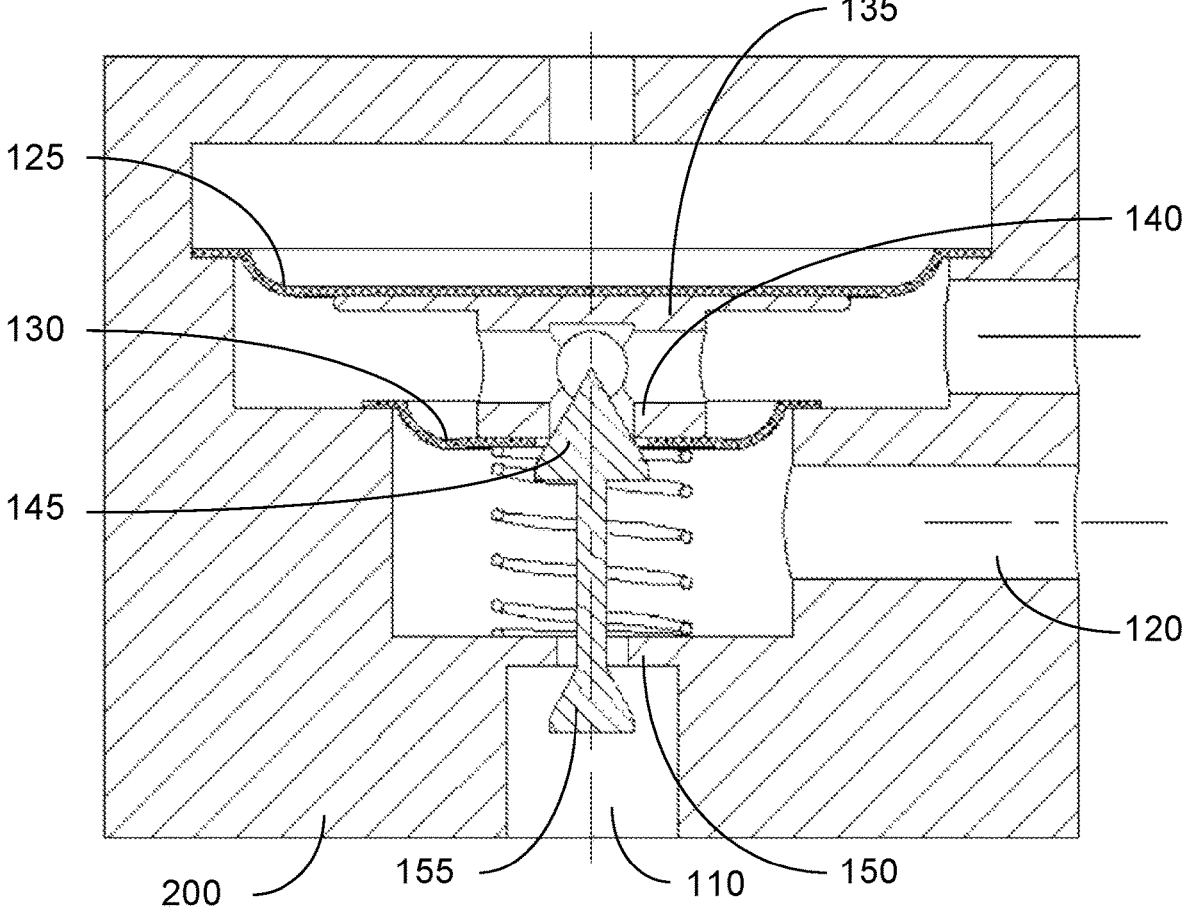
FIG. 2 shows a schematic sectional view of a double cone air power booster without additional spring in supply air mode (prior art)
Figure 3:
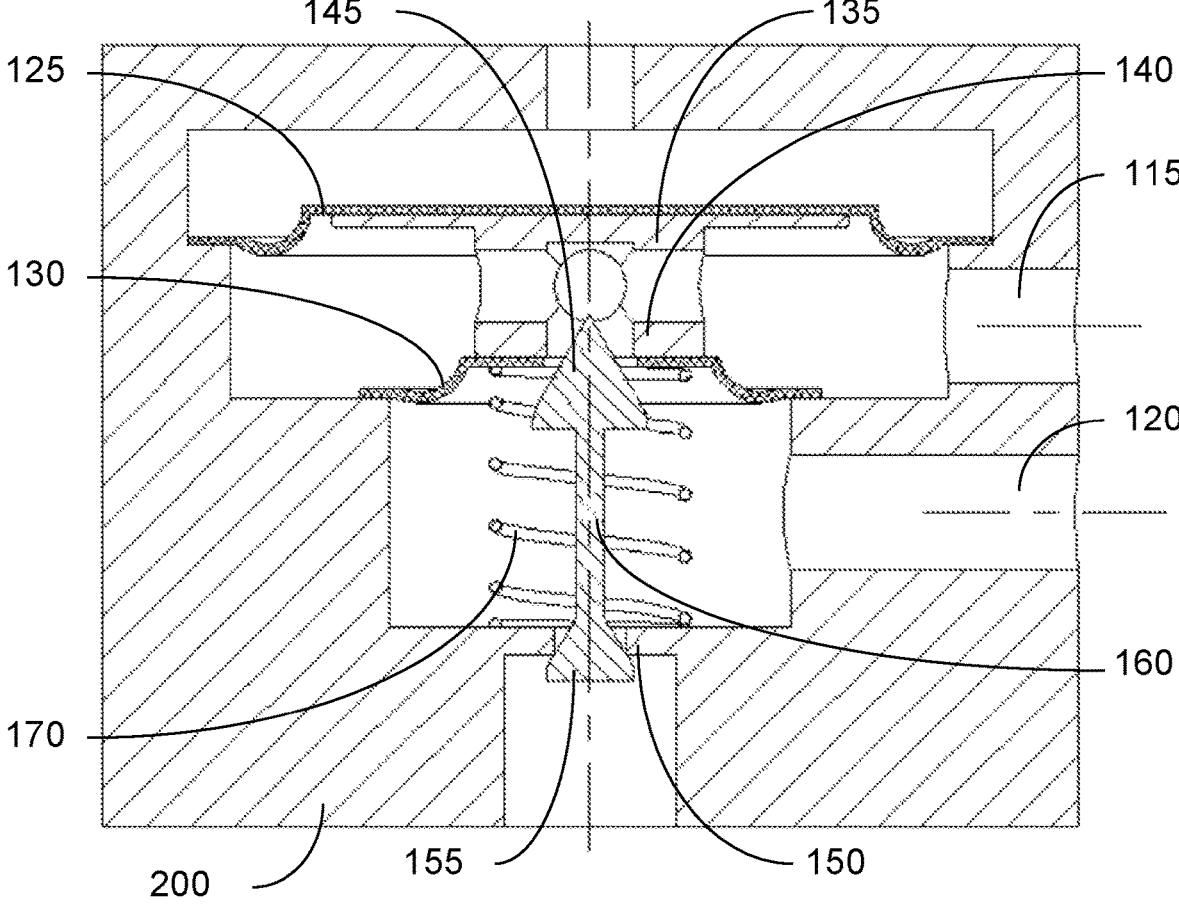
FIG. 3 shows a schematic sectional view through a double cone air power booster without additional spring in exhaust air mode (prior art)

FIGS. 1 to 3 will first be used to explain how a double cone air power booster works. This is prior art, which is not claimed, but must be explained for better understanding.

FIG. 1 shows the structure of a double cone air power booster 100, which has a control input 105 for the control pressure $P_{st}$, an supply air inlet 110, which is supplied with compressed air at the pressure $P_z$, an exhaust outlet 115, which is open to the environment, and an output 120 for compressed air at the desired output pressure $P_a$.

Between the control input 105 and the exhaust outlet 115 there is a first diaphragm 125 with the effective area $A_o$, and between the exhaust outlet 115 and the output 120 there is a second diaphragm 130 with the effective area $A_u$. The effective area of the respective diaphragm is limited approximately by the center of the beads of the diaphragm. These two diaphragms are connected by a control body 135, so that they move together. The control body 135 contains the exhaust seat 140 in its center, which is closed or released by the exhaust cone 145.

Between the supply air inlet 110 and output 120 is the supply air seat 150 with the cross-sectional area $A_z$, which is closed or opened by the supply air cone 155. The supply air and exhaust cones 155, 145 are firmly connected to each other so that they always move together and thus together form the double cone 160. This can be pre-tensioned by means of an additional spring 165, but this is not absolutely necessary.

There is also an offset spring 170, which presses the control body 135 and the two diaphragms 125, 130 in FIG. 1 upwards and ensures that the air power booster only starts working above a certain minimum control pressure, which overcomes the force of the offset spring 170. The offset spring 170 also supports safe venting in the event that the pilot system, which supplies the control pressure, cannot vent completely (this is often the case with conventional nozzle-baffle plate I/P converters, for example). The lower effective area 175 of the double cone can also be seen. Its significance is explained below.

FIG. 1 shows the air power booster in holding mode. This means that the control pressure $P_{st}$ and output pressure $P_a$ are exactly such that the first and second diaphragms 125, 130 and the control body 135 connecting them are in a central position in which both the supply air seat 150 and the exhaust seat 140 are closed by the double cone 160. Therefore, there is no fluid connection between the output 120 and the supply air inlet 110 or the exhaust outlet 115, so that the output pressure $P_a$ is maintained. In practice, this state (holding mode) is rarely important, as pneumatic consumers always have a certain basic leakage and a controlled air power booster must therefore go into supply air mode in order to maintain a state of the consumer in the long term.

FIG. 2 shows a double-cone air power booster 200, which differs from that in FIG. 1 only in the absence of the additional spring 165. In FIG. 2, the air power booster is in supply air mode. The control pressure $P_{st}$ is increased, but the output pressure $P_a$ is not yet, which is why the two diaphragms 125, 130 and the control body 135 are pressed downwards. Therefore, the exhaust seat 140 remains closed by the exhaust cone 145, but the supply air cone 155 is pressed downwards out of the supply air seat 150, so that pressurized air can flow in from the supply air inlet 110 and increase the output pressure $P_a$ at the output 120.

FIG. 3 shows the same double cone air power booster 200 as FIG. 2, but in exhaust mode. The control pressure $P_{st}$ is lowered so that the offset spring 170 and the output pressure $P_a$ of the compressed air in the consumer press the two diaphragms 125, 130 and the control body 135 upwards. For this reason, the supply air seat 150 is closed by the supply air cone 155, but the exhaust seat 140 is opened by the exhaust cone 145, as the exhaust seat 140 is also raised, but the exhaust cone 145 as part of the double cone 160 cannot follow, as it is connected to the supply air cone 155. As a result, compressed air escapes from the consumer through the exhaust outlet 115, so that the output pressure $P_a$ at the output 120 drops.

By varying the control pressure $P_{st}$, the output pressure $P_a$ can be set to any value between the ambient pressure and the supply pressure $P_z$.

When the double cone air power booster is in the fully regulated state, a force equilibrium applies to the control body 135. The following applies without taking other forces into account:

$$P_{st} * A_o = P_a * A_u$$

For a more precise description, the force $F_z$ of an additional spring (if present) and the effective force on the lower effective area $A_z$ of the double cone 160, which corresponds to the cross-section of the supply air seat 150, must also be taken into account, but only in supply air mode. In exhaust mode, these forces are supported on the housing via the supply air seat 150 and are absorbed by it. The force $F_{offset}$ of the offset spring 170, on the other hand, must always be taken into account. This results in different force balances for supply air and exhaust operation:

$$\text{supply air mode: } P_a * A_u + F_{offset} + P_z * A_z + F_z = P_{st} * A_o$$

$$\text{exhaust mode: } P_a * A_u + F_{offset} = P_{st} * A_o$$

The spring forces $F_z$ and $F_{offset}$ are assumed to be constant as a first approximation, as the double cone 160 and the control body 135 typically only move over small distances. The following therefore applies to the output pressure:

$$\text{in supply air mode: } P_a = \frac{P_{st} \cdot A_o - P_z \cdot A_z - F_{offset} - F_z}{A_u}$$

$$\text{in exhaust mode: } P_a = \frac{P_{st} \cdot A_o - F_{offset}}{A_u}$$

For identical control pressure, the output pressure in supply air mode is therefore reduced compared to exhaust mode. The reduction depends on the cross-section $A_z$ of the supply air seat 150, the strength of the additional spring and the supply air pressure $P_z$. If a characteristic curve is plotted for the dependence of the output pressure $P_a$ on the control pressure $P_{st}$, this results in a hysteresis-like curve.

Figure 4:
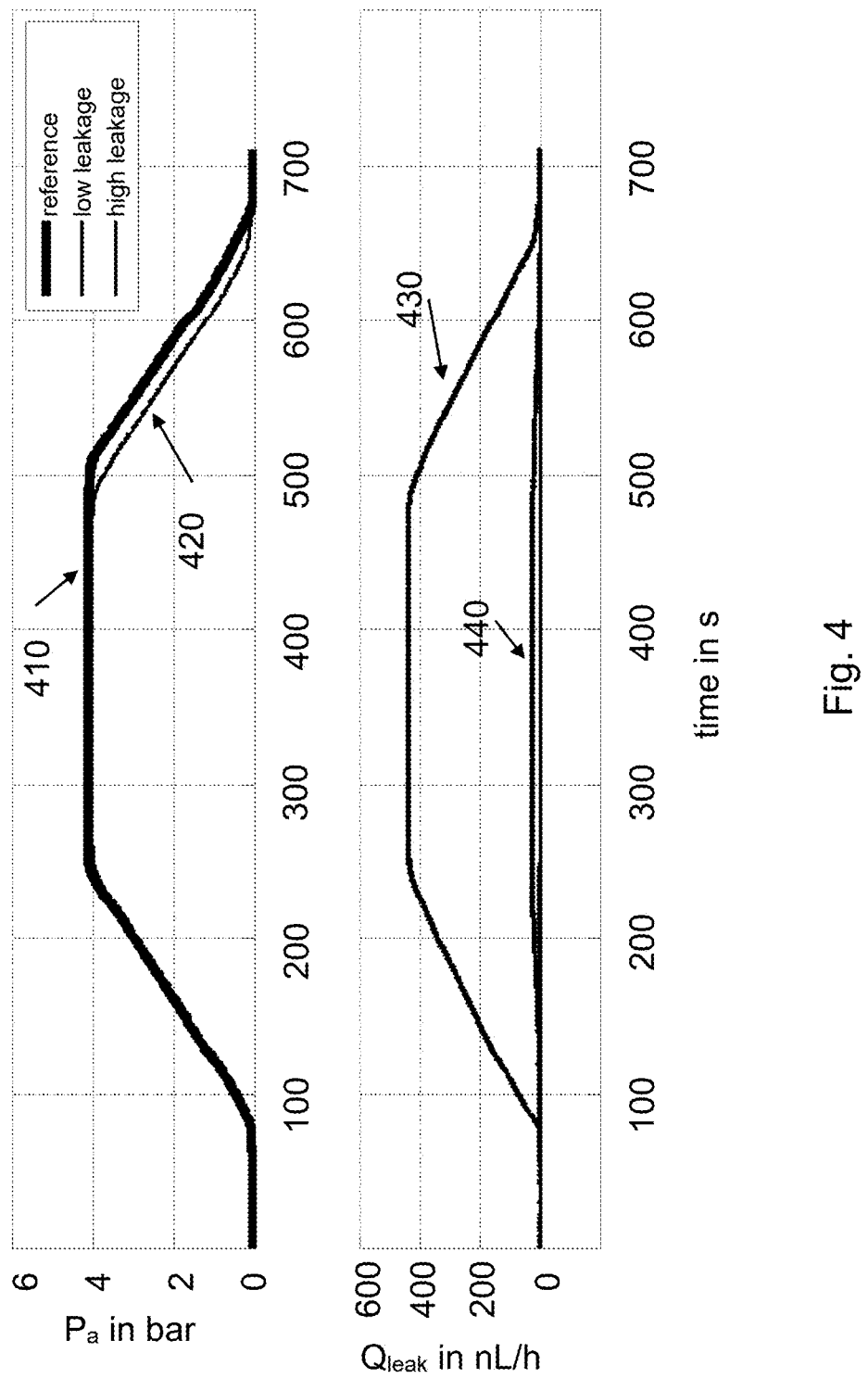
FIG. 4 shows a representation of the pressure curve and the leakage flow during a test function at varying leakages.

To obtain such a characteristic curve, a test function with a curve as shown in FIG. 4 can be used. The control runs a slow upward ramp of the input variable, and after a certain time an equally slow downward ramp is run. The corresponding behavior of the output pressure can be seen in the upper section of FIG. 4. The thick line 410 shows the reference behavior without leakage, while the thin line 420 shows the behavior with a strong leakage (typical leakage flow is a few hundred nL/h—nL are standard liters). With a comparatively low leakage of e.g. less than 50 nL/h, on the other hand, there is a curve that cannot be distinguished from the reference behavior in this representation. It can be seen that the behavior is essentially different for the downward ramp. In the lower section of FIG. 4, the associated leakage flows $Q_{leak}$ are plotted for a high leakage (curve 430) and for a low leakage (curve 440).

Figure 5:
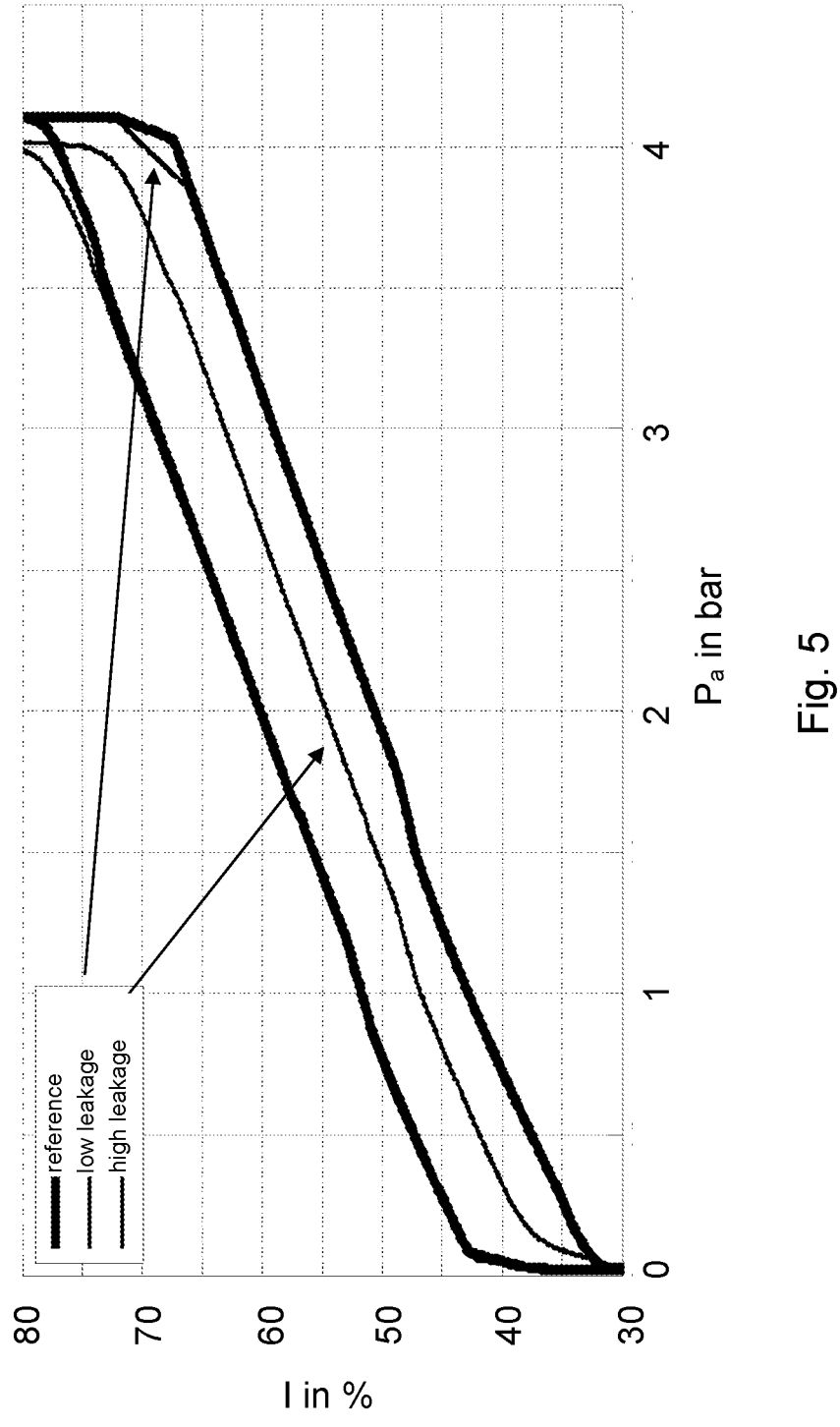
FIG. 5 shows I-P characteristic curves of an air power booster with upstream I/P converter at varying leakages.

FIG. 5 shows the corresponding characteristic curves of a double cone air power booster, preferably with an upstream I/P converter based on the nozzle-baffle plate principle. This corresponds to the configuration that is often used in practice, e.g. for the compressed air control of a control valve with pneumatic actuator. The input variable here is the current of the I/P converter, while the output variable is the output pressure of the air power booster. The input variable I is plotted on the y-axis in %, the output variable $P_a$ on the x-axis in bar. Both the double cone air power booster and the I/P converter exhibit hysteresis-like behavior, which results in the thick reference curve. The upper or left branch corresponds to supply air operation, while the lower or right branch corresponds to exhaust operation. As already explained, the output pressure in supply air mode is lower than in exhaust mode at the same flow rate. The behavior at low leakage differs only slightly from the reference curve. With a larger leakage, on the other hand, the entire branch for the exhaust mode shifts upwards or to the left, which means that the pressure is reduced compared to the reference curve at a given flow rate. The method provided makes use of these changes in behavior. Initially, such a reference curve is recorded and stored.

During operation, steady-state conditions are then determined, i.e. conditions in which both the input variable and the output variable change by not more than a specified tolerance within a specified time span, e.g. by a maximum of 10 mbar within 5 seconds.

If such a steady state (also known as operating point) is detected, a more detailed examination is carried out. This involves checking whether the operating point has been reached by an air supplying or venting process. For the intended leak detection, as already explained, only steady states that have been reached by venting, i.e. where the double cone air power booster is in exhaust mode, are of interest. For this purpose, the rate of pressure change, i.e. the first time derivative of the output pressure, is considered and provided with a tolerance band, for example. For example, an interval of +/−0.02 bar/s can be used as a tolerance band.

Figures 6A, 6B:
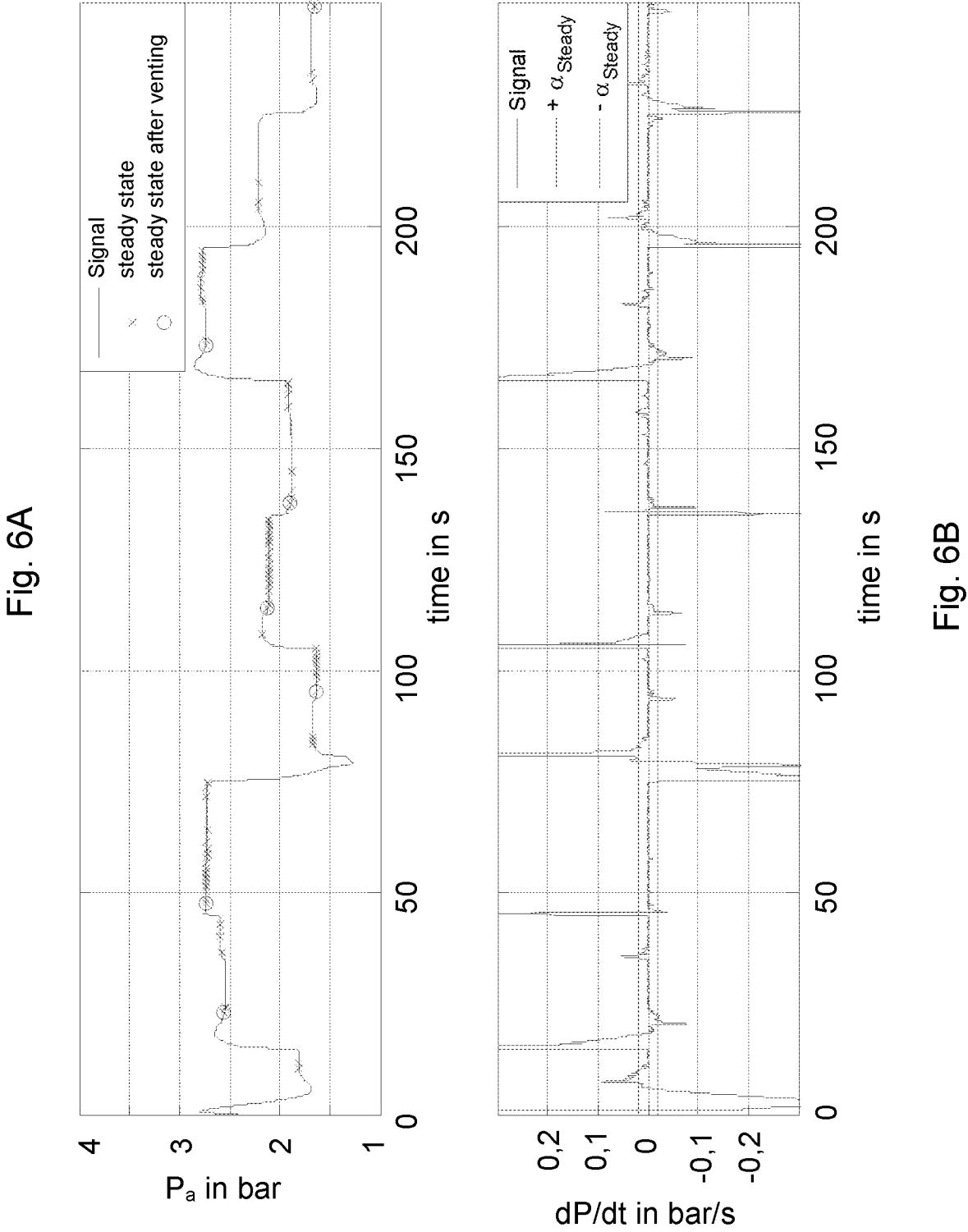
FIG. 6A shows a time curve of the output pressure during a simulated operating situation.
FIG. 6B shows the associated time curve of the derivative of the output pressure.

This is shown for a simulated operating situation in FIGS. 6A and 6B: FIG. 6A shows the time curve of the output pressure, FIG. 6B the corresponding time curve of the first time derivative of the output pressure with the tolerance band mentioned.

In FIG. 6A, the detected steady states are indicated by diagonal crosses. If a steady state is present as a result of penetration of the tolerance band in FIG. 6B from above, it was reached by supplying air and is therefore not taken into account. If, on the other hand, a steady state is present as a result of penetration of the tolerance band from below (i.e. the derivative was negative immediately beforehand), it was reached by venting.

These operating points are further taken into account and are marked by circles in FIG. 6A. FIG. 6B shows that—at least in this simulated example—larger changes or jumps are often followed by a small correction, and that suitable operating points are often only available for a short time directly after this correction.

Figure 7:
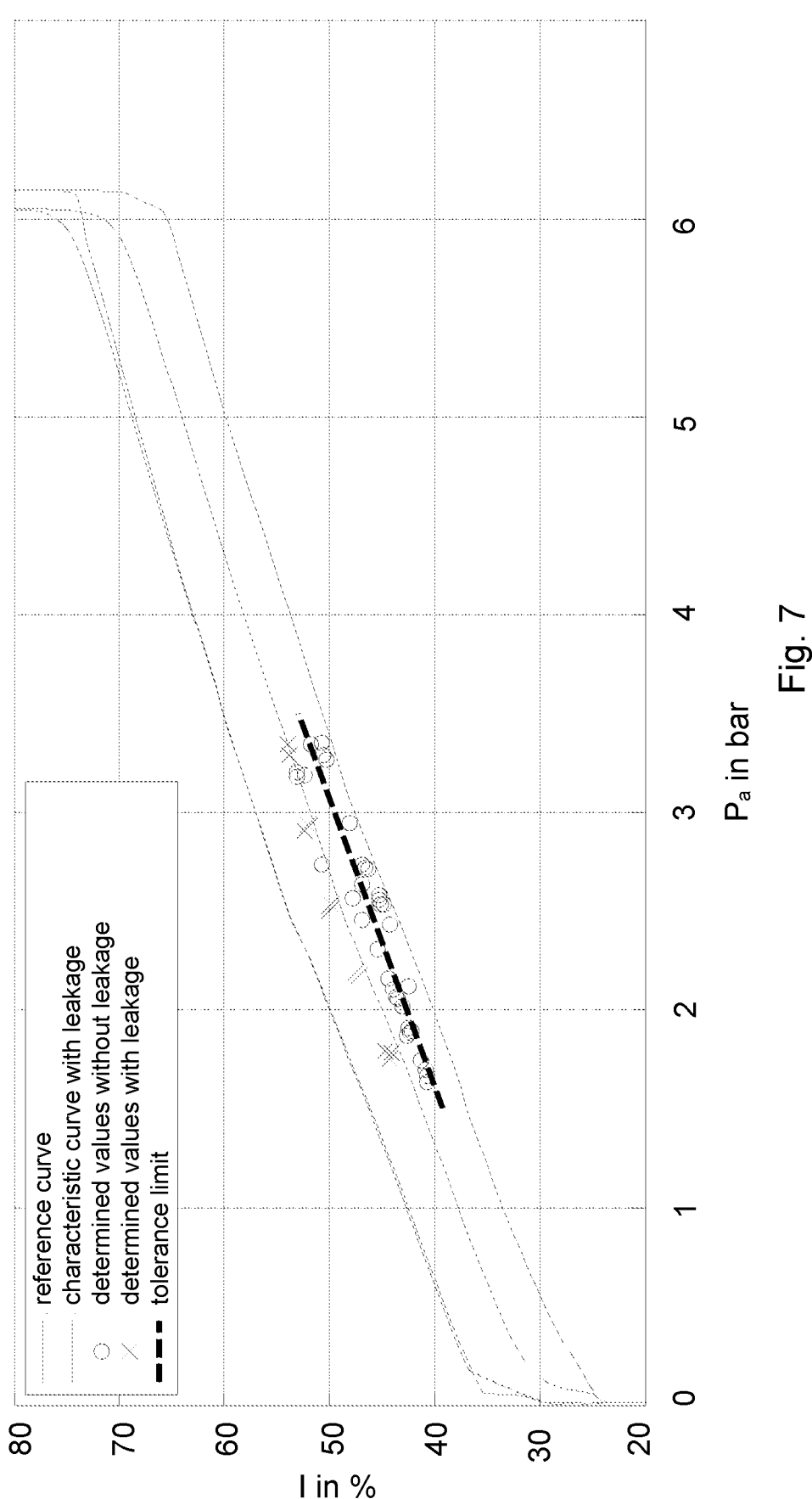
FIG. 7 shows determined steady states in comparison to the I-P characteristic curves from FIG. 5.

FIG. 7 shows how determined values of the input and output variables, e.g. the current of the I/P converter and the output pressure of the double cone air power booster, which belong to the steady states determined as described, are compared with the reference curve. A predetermined tolerance limit is used for this purpose, which is shown as a bold dashed line in FIG. 7. This tolerance limit could, for example, lie halfway between the reference curve and an expected characteristic curve for a leakage that is classified as just about unacceptable. Determined values that lie to the left of this tolerance limit (or, equivalently, above it) indicate a significant leak, as at these operating points there is a lower output pressure for a given current than would be expected according to the reference curve. However, no leak can be detected at operating points whose corresponding determined values are below or to the right of this tolerance limit.

In order to compensate for statistical fluctuations and other faults and to avoid frequent false alarms or erroneous diagnoses, it makes sense to consider a larger number of operating points and to select a conservative condition for leak detection. In a typical example, the last 30 operating points may be considered. A leak would preferably only be detected if the values determined at these operating points are all above or to the left of the tolerance limit, without exception.

Glossary

I/P Converter
I/P converters are electric to pneumatic converters that generate an output air pressure depending on the current strength of an electric input signal.
I/P Converter Based on the Nozzle-Baffle Plate Principle
I/P converters based on the nozzle-baffle plate principle are described in detail in the publication DE 198 18 336 C1, for example. Such a converter or transducer has a coil, a magnet yoke and a rotatable armature in the form of a baffle plate. The baffle plate can close and release an outlet nozzle, depending on the resultant torque due to the pneumatic force repelling the baffle plate and the magnetic force attracting the armature. The system is also supplied with compressed air. By opening or closing the outlet nozzle depending on the current strength through the coil causing the magnetic force, an output air pressure is set, which is proportional to the current strength.
Standard Liter
The standard volume (in particular standard cubic meters, standard liters, etc.) is a unit of volume commonly used in pneumatics, process engineering and gas technology. It is used to compare gas quantities that are present at differing pressures and temperatures (operating state, operating volume). For this purpose, the gas quantities are respectively converted to the same standard state, e.g. 0° C. and 1 atm (According to https://de.wikipedia.org/wiki/Normvolumen).
Steady State
A steady state or stationary state is understood here to be a state of the double cone air power booster in which both the input variable and the output variable change by not more than a specified tolerance within a specified period of time. The input variable is a variable that controls an output pressure of the double cone air power booster, e.g. the control pressure of the air power booster, or a current if an I/P converter is connected upstream. The output variable is the output pressure of the double cone air power booster or a variable controlled or derived from the output pressure, e.g. the position of the valve element, if the air power booster supplies a pneumatic valve actuator with compressed air.

REFERENCE SYMBOLS 100, 200, 500 double cone air power booster
105 control input
110 supply air inlet
115 exhaust outlet
120 output
125 first diaphragm
130 second diaphragm
135 control body
140 exhaust seat
145 exhaust cone
150 supply air seat
155 supply air cone
160 double cone
165 additional spring

US 12,607,537 B2

9                                              10

170 offset spring
175 lower effective area of the double cone
410 reference outlet pressure curve for test function
420 output pressure curve for test function with strong leakage
430 leakage flow curve for test function (high leakage)
440 leakage flow curve for test function (low leakage)

CITED LITERATURE

Cited Patent Literature

DE 37 41 364 A1
DE 198 18 336 C1
EP 1 769 159 1
U.S. Pat. No. 4,157,656 A
US 2003/0208305 A1
WO 2018/035181 A1
The invention claimed is:
1. A method for detecting output-side leaks of a double cone air power booster, comprising the following steps:
initial recording of a reference curve that relates an input variable to an output variable;
wherein the input variable is a variable that controls an output pressure of the double cone air power booster;
wherein the output variable is the output pressure of the double cone air power booster or a variable controlled by or derived from the output pressure;
determining at least one steady state during operation;
wherein only steady states preceded by a drop in the output pressure of the double cone air power booster are considered;
determining values of the input variable and the output variable that belong to the steady state;
comparing the values determined with the reference curve;
determining an output-side leak if the output pressure corresponding to the determined output variable is smaller by a predetermined tolerance than the output pressure to be expected according to the reference curve for the determined input variable.
2. The method according to claim 1,
comprising the further step of creating a data carrier on which the determined values and/or results and/or the reference curve are stored.
3. A device which is configured to perform the method according to claim 1.
4. The method according to claim 1, wherein:
a plurality of steady states are determined;
values of the input variable and the output variable are determined for each of these steady states; and
all these determined values are compared with the reference curve.

5. The method according to claim 4, wherein:
an output-side leak is determined if, during a predetermined measuring period, all output pressures corresponding to the determined output variables are smaller by a predetermined tolerance than the output pressures to be expected according to the reference curve for the determined input variables.
6. The method according to claim 4, wherein:
an output-side leak is determined if, for a predetermined number of output variables determined most recently, the output pressures corresponding to the determined output variables are smaller by a predetermined tolerance than the output pressures to be expected according to the reference curve for the determined input variables.
7. A system for detecting output-side leaks of a double cone air power booster, comprising:
a double cone air power booster;
a control and/or regulation system for controlling and/or regulating an input variable of the double cone air power booster;
wherein the input variable is a variable which controls an output pressure of the double cone air power booster; and having
means for determining a steady state;
means for recording the input variable and an output variable;
wherein the output variable is the output pressure of the double cone air power booster or a variable controlled by or derived from the output pressure;
means for recording a reference curve which relates the input variable to the output variable;
means for comparing recorded values with the reference curve; and
means configured to perform the steps of the method according to claim 1.
8. The system according to claim 7, wherein:
the system comprises an I/P converter,
wherein the I/P converter provides a control pressure for the double cone air power booster; and
wherein the input variable is the current flowing through the I/P converter.
9. The system according to claim 8, wherein:
the I/P converter is constructed according to the nozzle-baffle plate principle.
10. A positioner for a pneumatically actuated control valve having a system according to claim 7.
11. A pneumatically actuated control valve having a positioner according to claim 10.
12. A process plant having at least one pneumatically actuated control valve according to claim 11.

* * * * *